United States Patent [19]

Thiel et al.

[11] Patent Number: 4,467,397
[45] Date of Patent: Aug. 21, 1984

[54] MULTI-SECTION POWER CAPACITOR WITH ALL-FILM DIELECTRIC

[75] Inventors: Peter H. Thiel; George E. Mercier; Michael D. Pruett, all of Bloomington, Ind.

[73] Assignee: Westinghouse Electric Corp., Pittsburgh, Pa.

[21] Appl. No.: 293,788

[22] Filed: Aug. 18, 1981

[51] Int. Cl.³ .......................... H01G 4/38; H01G 4/06
[52] U.S. Cl. ..................................... 361/328; 361/313
[58] Field of Search ............... 361/328, 314, 315, 303, 361/309, 305–308, 304, 313, 311, 323, 324; 29/25.42

[56] References Cited

U.S. PATENT DOCUMENTS

| | | | |
|---|---|---|---|
| 1,952,925 | 3/1934 | Kopinski | 361/309 |
| 2,638,494 | 5/1953 | Liechti | 361/313 X |
| 3,256,472 | 6/1966 | Centurioni | |
| 3,390,312 | 6/1968 | England | 361/323 X |
| 3,789,277 | 1/1974 | Craig et al. | 317/260 |
| 4,344,105 | 8/1982 | Holtzman et al. | 361/328 |
| 4,348,712 | 9/1982 | Newcomb | 361/314 X |
| 4,348,713 | 9/1982 | Grahame | 361/314 X |

FOREIGN PATENT DOCUMENTS

| | | | |
|---|---|---|---|
| 142350 | 12/1947 | Australia | 361/309 |
| 0045397 | 2/1982 | European Pat. Off. | |
| 1048352 | 1/1959 | Fed. Rep. of Germany | 361/309 |
| 2848180 | 5/1979 | Fed. Rep. of Germany | 361/328 |
| 44-25410 | 10/1969 | Japan | |
| 1250450 | 10/1971 | United Kingdom | |
| 2007432 | 5/1979 | United Kingdom | |
| 2009509 | 6/1979 | United Kingdom | 361/328 |
| 2029444 | 3/1980 | United Kingdom | |
| 2111749 | 7/1983 | United Kingdom | |

Primary Examiner—Donald A. Griffin
Attorney, Agent, or Firm—G. H. Telfer

[57] ABSTRACT

An all-film power capacitor in which the sections have extended electrode foils and relatively large area edge connections of deposited metal and the space factor of the section winding is relatively high.

9 Claims, 5 Drawing Figures

MULTI-SECTION POWER CAPACITOR WITH ALL-FILM DIELECTRIC

BACKGROUND AND SUMMARY OF THE INVENTION

The present invention relates to power capacitors having a plurality of capacitive section windings within an enclosure and interconnections between the windings and external terminals.

A power capacitor is intended for long life over a wide range of environmental conditions and circuit operating conditions. A multiplicity of factors influence the performance of a power capacitor and its ability to maintain successful operation over a period of many years under a variety of conditions. All of these factors have to be considered in relation to cost in order to achieve the highest level of performance at the lowest cost. This compels attention to the utilization of materials in the best manner possible in order to achieve the highest performance without undue increase in cost.

Power capacitors are commonly made with a plurality of wound capacitor sections in a common enclosure having terminals extending through the enclosure. Each of the sections has a pair of foil electrodes and a plurality of sheets of solid dielectric material between the electrodes. For a variety of reasons, preference is growing in the power capacitor art for the solid dielectric material to consist only of plastic film material, such as polypropylene, rather than capacitor grade paper, or composites of paper and film, as has been used in the past. Two aspects of importance in relation to this general type of capacitor that are dealt with particularly in the present invention are the manner in which the individual capacitor sections are formed and the manner in which the sections are interconnected with each other and with the terminals of the unit.

"Space factor" in a capacitor is defined as the ratio of the distance between a pair of foil electrodes in a capacitor section to the sum of the thicknesses of the one or more sheets of solid dielectric material between these electrodes. A space factor of unity would exist in the case in which the solid dielectric material totally filled the volume between the electrodes. A space factor of less than unity is, of course, not possible. A number of practical considerations dictate that the space factor of an actual capacitor of the type with which we are concerned here will always be something greater than unity. For example, a space factor of 1.30 indicates the distance between electrodes, X, divided by the sum of the dielectric sheet thicknesses, which, for example in an instance of a two layer dielectric of like thickness for each sheet, may be designated as 2Y, where Y is the individual sheet thickness, is 1.3 or the distance X is 30% greater than the sum of the layer thicknesses. Merely to provide some representative numbers, in accordance with the practice in the art prior to this invention in calculating a space factor, a typical example would be one in which the foil electrodes are spaced a distance X of about 1.82 mils and the solid dielectric material consists of two sheets of polypropylene film, each having an individual thickness Y of about 0.70 mils resulting in a space factor of about 1.30.

The practice in the art is for such power capacitors as described to be substantially completely impregnated with a liquid dielectric fluid. This means that there are intended to be no voids in the structure. As space factor is discussed herein, it is to be understood that it relates to the finished capacitor, as wound and ready to be impregnated. The space factor prior to and after impregnation may be in certain cases different because certain impregnants tend to be absorbed within and cause swelling of film type dielectric materials.

Determination of space factor, for a given set of materials and impregnation conditions, is attained by the winding of a specified number and thickness of sheet materials, electrode foils and dielectric sheets, and with control of the tension during winding, and the final pressed dimension of the flattened stack of sections.

For example, to increase the space factor a certain amount, say from 1.20 to 1.30, with a given set of materials, would normally require a reduction of the number of winding turns in the finished section that will occupy a given space in the finished unit. Such adjustments in design are well within the skill of those accustomed to designing and manufacturing such capacitor sections.

As space factor is discussed in this application, it may be determined by certain known procedures such as unwinding a completed section and counting the number of turns of the sheet materials and by measuring the thicknesses of these sheet materials. The space between foils, in a typical section of the final stacked assembly, is computed by reducing the section thickness in the finished unit by the total buildup of electrode materials as determined by the measurements from the unwound section. The buildup of dielectric sheets is computed from the number of turns of such materials that are between foils and the measured thicknesses of these sheet materials. The space factor is then computed from the ratio of the computed distance between foils and the computed thickness of dielectric materials. The figure obtained, as determined by dimensions in the intermediate portion of a section, is reliable as the average space factor of a given section.

Space factor is limited in its acceptable range as capacitors are presently made. A low space factor may be considered undesirable even though it offers the advantage of achieving a smaller volume for a given amount of capacitance and reactive power rating. The dielectric strength and hence the ability of the capacitor to withstand voltage stress, can be unfavorably reduced with a low space factor. This is of particular significance at edges of the foil electrodes that contact the dielectric sheet material because there may be a concentration of electrical field at such points. A low space factor also tends to impair cold temperature switching capabilities. In some climates, capacitors are subjected to extremely cold temperatures such as about $-40°$ C. Switching at such cold temperatures, particularly frequent switching, can cause breakdown or failure which is understood to be because of contraction of the materials in the capacitor and the formation of voids which are free of either solid dielectric material or liquid impregnant. A general difficulty of low space factor capacitor windings, of all-film dielectric, is that impregnation is more difficult. There is less facility for the liquid impregnant to penetrate within the section to form a liquid layer on each surface of the dielectric sheet material.

Generally speaking, a looser winding with a higher space factor alleviates the problems mentioned in the preceding paragraph because of the improved ability to impregnate thoroughly. However, a high space factor can be seriously detrimental when using pressure contacts, referred to as tabs, to make contact to the electrode foils for interconnecting sections with each other and the unit terminals. It has been found that even in instances in which the space factor is sufficiently low so that the tabs are securely held within the section, they are still susceptible to arcing, particularly when high current densities occur during capacitor discharge. This arcing can deteriorate the dielectric to the extent of sometimes shorting out the capacitor unit.

The present invention is a combination of elements which permits the space factor to be relatively high, preferably about 1.30, and provides good performance over the totality of expected conditions including extreme cold temperatures and frequent switching. The capacitor sections of this invention are characterized in comprising foil electrodes with an all-film dielectric in wound sections having a space factor of a relatively high value. Conductive tabs are avoided. Instead an extended foil construction is used whereby the respective foils are offset and extend from respective ends of the section, and connections thereto are made by deposited metal, such as a molten solder layer, over the ends of the section. The deposited metal occupies a substantial area of those section ends, such as at least about 30%, which achieves a reliably performing unit which does not have the drawbacks of poor impregnation or the drawbacks of unfavorable arcing conditions because of the use of conducting tabs. In accordance with this invention, prior difficulties in obtaining a satisfactory space factor for insuring impregnation are avoided because the space factor need not be made low for the purpose of insuring good conduction at conductive tabs.

Certain capacitors have been made in the past with an extended foil construction. Such capacitors are known to have been made with a paper dielectric and also with a paper-film dielectric. In these instances, the reasons for practicing the extended foil technique has been to make capacitors with low inductance, or energy storage for capacitor discharge applications, or for high continuous current capacity such as in low voltage capacitors. These are normally not requirements for power factor correction capacitors which may account for the lack of use of extended foil construction in most power capacitors, including all known all-film units. Further, the apparent impairment of impregnation by use of a soldered edge connection tends to lead away from the use of that technique in all-film units. Here, in accordance with the present invention, the technique of extended foils and soldered edge connections is practiced in an all-film capacitor having a high space factor that is more optimal than prior all-film capacitors in terms of achieving maximum impregnation while retaining secure conductive connections. It is further possible in this invention to use a structure in which the internal edges of each of the electrodes is formed as a rounded and smooth edge such as by folding the edge material a short distance so that the electrode edge is the outside of the fold. This is a means for reducing the susceptibility of the capacitor to voltage breakdown. When the folded or rolled edge is used, there is a natural tendency for the space factor to be increased over most of the section because of the double thickness of electrode foil material at the edge while there is only a single thickness of foil material elsewhere.

DESCRIPTION OF THE PREFERRED EMBODIMENTS

Figure 1:
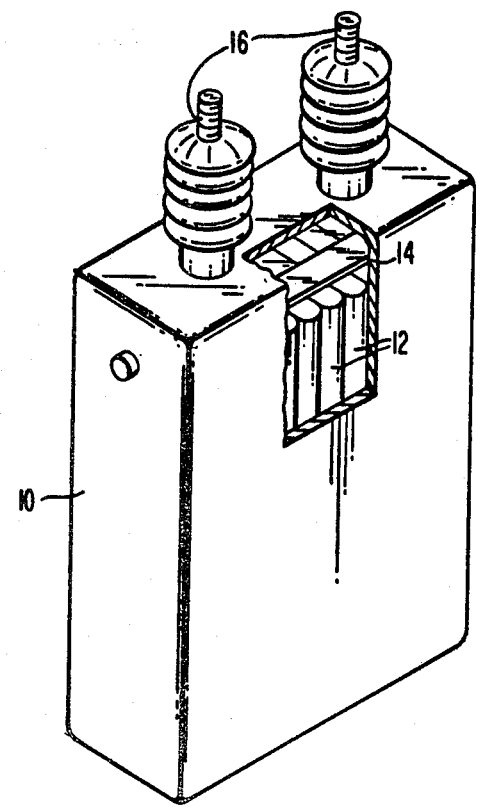
FIG. 1 is a general perspective view of a capacitor unit in accordance with the present invention, partly broken away.

FIG. 1 shows a capacitor unit having a unitary housing 10 that encloses a plurality of wound capacitor sections 12 that are stacked on end in the housing. In accordance with this invention the capacitor sections 12 each comprise electrode foil material and a dielectric material which consists entirely of plastic film such as polypropylene. Each section 12 is wound with dielectric material on each side of the two electrodes (as in FIG. 3) in a convolute winding. The unit is impregnated with a liquid dielectric fluid. The plurality of capacitor sections are mutually interconnected by metal areas 14 deposited on the ends of the sections and contacting extended foil material that extends from the sections outside the zone in which the dielectric film is located. The plurality of interconnected sections are connected to terminals 16 extending from the housing 10 by wire conductors at selected locations.

Figure 2A:
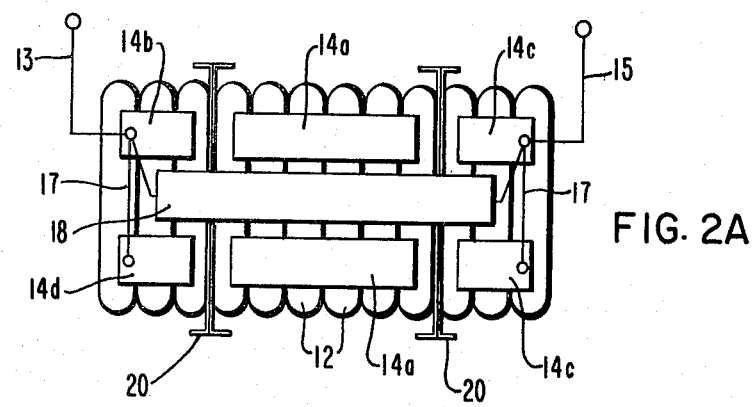
FIG. 2A is a top view of an exemplary arrangement of a plurality of capacitor sections for a capacitor unit in accordance with the present invention.
Figure 2B:
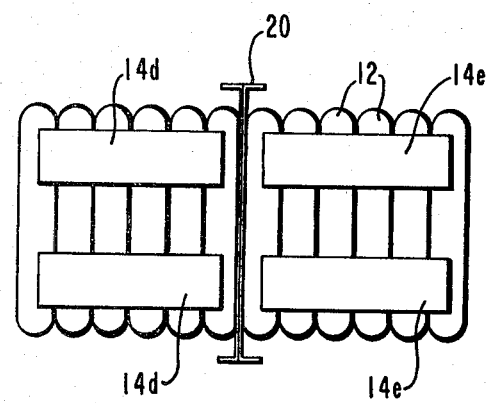
FIG. 2B is a bottom view of an exemplary arrangement of capacitor sections.
Figure 2C:
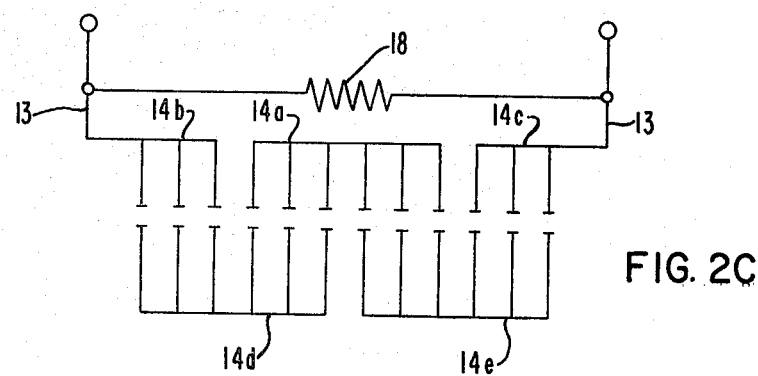
FIG. 2C is an electrical circuit schematic of the capacitor sections as shown and as interconnected in accordance with FIGS. 2A and 2B.

FIGS. 2A and 2B are top and bottom views respectively of a stack of capacitor sections 12 in accordance with the present invention to provide a more particular example of their interconnection. In this example, there are twelve capacitor sections 12 that are interconnected so that there are four series groups with three parallel capacitor sections in each group. FIG. 2C gives the electrical circuit schematic.

In the top view of FIG. 2A the intermediate six sections of units are each respectively connected by two areas 14a of deposited solder material. This material is applied in the general pattern as shown which results in the formation of strip-like conductors sometimes referred to as a "solder mat". Also shown in the top view of FIG. 2A is that the three end sections on each end of the stack are interconnected by solder material areas 14b and 14c, respectively, and they also have leads 15 extending from each of the end sections which are for connection with the housing terminals 16. Additional leads 17 connect the solder areas on each of the end sections. Item 18 is a set of discharge resistors connected between the leads 15. Resistors 18 are located in an insulative sheath and are not joined to the capacitor sections other than by their conductive leads.

In the bottom view of FIG. 2B it is shown that the left and right six sections are mutually interconnected by respective solder areas 14d and 14e. The winding of the various sections is generally in accordance with known practice with steps taken to achieve the desired space factor.

The solder material can be deposited while applying a heated tool or "iron" over the ends of the sections which tends to flatten the extended foil material (shown in FIG. 3) and make sure there is intimate contact between the solder and that extended foil material. To prevent undesirable shorts between section ends that are not to be connected, a block which can be simply an insulating element 20 extending from the sections sufficiently to avoid communication of solder areas on each side thereof is provided between those sections that are not to be connected.

Figure 3:
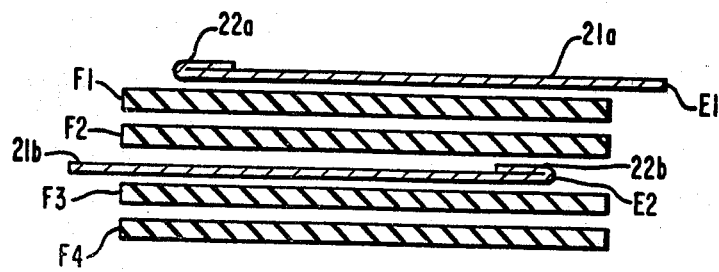
FIG. 3 is a cross sectional view of part of a capacitor section in accordance with one embodiment of the present invention.

In the capacitor section cross section of FIG. 3 is shown a plurality of dielectric film sheets, preferably of polypropylene, in two groups of two each (F1 and F2 in one group and F3 and F4 in the other) so there is film material on each side of each of the foil electrodes E1 and E2 when a convolute winding is formed. The foil electrodes E1 and E2 respectively extend beyond the lateral extremity of the dielectric film material on opposite sides of the wound section so that E1 has an extended edge 21a on the right side and E2 has an extended edge 21b on the left side. The extended material need only be about one-quarter of an inch in practice to achieve reliable solder mat interconnections as shown in FIGS. 2A and 2B.

As is preferred in the practice of this invention, each of the internal edges 22a and 22b of the electrodes E1 and E2, respectively, has a rolled edge or at least a rounded and smooth edge so as to minimize the risk of breakdown due to high voltages at such areas.

In accordance with preferred forms of the invention, the polypropylene film layers include at least some of the roughened surface type to further facilitate impregnation. Also, a preferred impregnant in the practice of this invention is an isopropylbiphenyl fluid such as is described in U.S. Pat. No. 4,054,937.

It is the case that in units made in accordance with the invention the deposited metal on the ends of the sections covers an area of about 30% to about 50% of the ends of the sections. The illustrations of FIGS. 2A and 2B are somewhat idealized as the exact configuration of areas 14a through 14e need not be, and will not be in practice, so uniformly rectangular. It is sufficient to have a more irregular pattern. A substantial area of deposited metal ensures good conductive contact. While the presence of such deposited metal would naturally tend to interfere with the introduction of impregnant within the sections, it has been found that by selection of an appropriate space factor, the conductive material area can be kept relatively large within the range of about 30% to 50%, while still insuring thorough impregnation. In accordance with the present invention, the space factor is preferred to be within the range of from about 1.25 to about 1.35. This contrasts with capacitor units heretofore made of all-film material in which the space factor was designed to be about 1.20 in order to try to insure that there was sufficiently good pressure contact at the conductive tabs that were used in such units. Even with such a low space factor as 1.20 it was found that cold temperature switching characteristics were unfavorable. This was contributed to by the low space factor which impaired impregnation so that one could not be sure of thorough liquid coverage of the film surfaces.

Capacitor sections with rolled foil edges have a different space factor at the rolled edge than in the intermediate part of the section. This generally is less than that in the intermediate portion by about 0.1. Thus a preferred structure with rolled edges has a space factor over most of the section of about 1.25 to about 1.35 while at the rolled edge the space factor is about 1.15 to about 1.25.

Now one can achieve both thorough impregnation as well as secure conductive contact without trading off one for the other. The result of this use of a higher space factor is improved dielectric strength, improved cold temperature switching, increased discharge capability, lower losses, and generally improved reliability. As an example, one factor is that there is a significant increase, greater than 500%, in the capacitor discharge capability (number of discharges before failure) due to the large contact area of direct connection rather than conductive tabs. Yet it is found that this large contact area on the ends of the sections, when coupled with the space factor in accordance with this invention still permits thorough impregnation.

It will be apparent that the invention may be practiced in various forms other than those specifically shown and described herein.

We claim:

1. A power capacitor comprising:

a plurality of wound capacitor sections in an enclosure having first and second terminals extending through the enclosure;

each of said capacitor sections comprising first and second foil electrodes and one or more sheets of dielectric material between said electrodes on both sides of said respective electrodes, said dielectric material consisting essentially of plastic film material, said pair of foil electrodes being laterally offset from each other and from said sheets of dielectric material within each of said wound sections to provide a first edge of said first electrode extending from the edge of said dielectric material at a first end of said wound section and a second edge of said first electrode confined between two of said sheets of dielectric material, and a first edge of said second electrode extending from the edge of said dielectric material at a second end of said wound section and a second edge of said second electrode confined between two of said sheets of dielectric material, said extended first edge of said first electrode and said extended first edge of said second electrode so extending over substantially the entire length of said electrodes in said section;

said second edges of each of said first and second electrodes being rounded and smmoth and each being the exterior of a fold of the material of said foil electrodes;

each of said capacitor sections having a space factor over the intermediate portion thereof between said second edges of said electrodes of from about 1.25 to about 1.35 as determined by the ratio of the distance between said pair of foil electrodes to the thickness of said dielectric material therebetween and having a space factor at said second edges of from about 1.15 to about 1.25;

said plurality of wound capacitor sections being assembled in a stack within said enclosure with ends of said sections being substantially aligned; available space within said enclosure, including the interior of each of said sections, being substantially filled with a liquid dielectric impregnant;

connection means for selectively connecting said foil electrodes of said sections with each other and with said terminals, said connection means comprising areas of deposited metal disposed on end surfaces of said stack of sections and contacting a substantial portion of said extended electrode edges, and conductive leads connected between certain ones of said areas of deposited metal and said terminals.

2. A power capacitor in accordance with claim 1 wherein:

said areas of deposited metal of said connection means cover from about 30% to about 50% of the end surfaces of said sections.

3. A power capacitor in accordance with claim 1 wherein:
   said dielectric sheet material is polypropylene.

4. A power capacitor in accordance with claim 3 wherein:
   at least one surface of at least one sheet of dielectric material is roughened to facilitate impregnation of said liquid dielectric impregnant.

5. A power capacitor in accordance with claim 1 wherein:
   said areas of deposited metal of said connection means cover from about 30% to about 50% of the end surfaces of said sections; and,
   said dielectric sheet material is polypropylene.

6. A power capacitor in accordance with claim 1 wherein:
   said liquid dielectric impregnant comprises a major portion of an isopropylbiphenyl fluid.

7. A power capacitor in accordance with claim 1 wherein:
   said areas of deposited metal of said connection means cover from about 30% to about 50% of the end surfaces of said sections;
   said dielectric sheet material is polypropylene; and,
   said liquid dielectric impregnant comprises a major portion of an isopropyl biphenyl fluid.

8. A power capacitor in accordance with claim 1 wherein:
   each of said capacitor sections has a space factor over the intermediate portion thereof between said second edges of said electrodes of about 1.30 and a space factor at said second edges of said electrodes of about 0.1 less than that of said intermediate portion.

9. A power capacitor in accordance with claim 8 wherein:
   said areas of deposited metal of said connection means cover from about 30% to about 50% of the end surfaces of said sections;
   said dielectric sheet material is polypropylene and said liquid dielectric impregnant comprises a major portion of an isopropylbiphenyl fluid and at least one surface of at least one sheet of polypropylene is roughened to facilitate impregnation.

* * * * *